United States Patent
Li (10) Patent No.: US 10,391,459 B2
(45) Date of Patent: Aug. 27, 2019

(54) OXYGENATED WATER PRODUCING APPARATUS

(71) Applicant: CAFTAL BIOTECH CO., LTD., Kaohsiung (TW)

(72) Inventor: Chin-Kai Li, Pingtung County (TW)

(73) Assignee: CAFTAL BIOTECH CO., LTD., Kaohsiung (TW)

( * ) Notice: Subject to any disclaimer, the term of this patent is extended or adjusted under 35 U.S.C. 154(b) by 185 days.

(21) Appl. No.: 15/667,453

(22) Filed: Aug. 2, 2017

(65) Prior Publication Data
US 2019/0039031 A1 Feb. 7, 2019

(51) Int. Cl.
| | |
|---|---|
| C25B 9/06 | (2006.01) |
| C25B 9/00 | (2006.01) |
| C25B 11/00 | (2006.01) |
| B01F 3/04 | (2006.01) |
| C02F 1/74 | (2006.01) |
| C02F 9/00 | (2006.01) |
| B01F 5/06 | (2006.01) |
| B01F 5/16 | (2006.01) |
| C02F 1/68 | (2006.01) |
| C02F 1/72 | (2006.01) |
| C01B 5/00 | (2006.01) |
| C02F 1/00 | (2006.01) |
| C02F 1/28 | (2006.01) |
| C02F 1/42 | (2006.01) |
| C02F 1/44 | (2006.01) |
| C02F 1/461 | (2006.01) |
| C02F 1/78 | (2006.01) |

(52) U.S. Cl.
CPC ...... *B01F 3/04439* (2013.01); *B01F 3/04503* (2013.01); *B01F 3/04985* (2013.01); *B01F 5/0689* (2013.01); *B01F 5/16* (2013.01); *C02F 1/74* (2013.01); *C02F 9/005* (2013.01); *B01F 2003/04879* (2013.01); *B01F 2003/04886* (2013.01); *C01B 5/00* (2013.01); *C02F 1/001* (2013.01); *C02F 1/283* (2013.01); *C02F 1/42* (2013.01); *C02F 1/441* (2013.01); *C02F 1/461* (2013.01); *C02F 1/68* (2013.01); *C02F 1/727* (2013.01); *C02F 1/78* (2013.01); *C02F 2303/26* (2013.01); *C02F 2307/10* (2013.01)

(58) Field of Classification Search
CPC .............. C25B 9/06; C25B 9/00; C25B 11/00
USPC ....................................................... 204/242
See application file for complete search history.

(56) References Cited

U.S. PATENT DOCUMENTS 3,701,728 A * 10/1972 Appleman ............ C02F 1/4674
210/668

FOREIGN PATENT DOCUMENTS

CN 2344398 * 7/1998 ................ C02F 1/42

* cited by examiner

*Primary Examiner* — Zulmariam Mendez
(74) *Attorney, Agent, or Firm* — Sinorica, LLC (57) ABSTRACT

An oxygenated water producing apparatus has a filtration assembly, an oxygen dissolving assembly, a minimizing assembly, and an electrolytic assembly that communicate with one another. The filtration assembly has a water filtration device, a water softener, and a water purifier communicating with one another in series. The oxygen dissolving assembly has a cooling tank communicating with the water purifier, a pump communicating with the cooling tank, an air pipe connected to the pump, and a pressure tank communicating with the pump. The minimizing assembly has at least one minimizing device. Each minimizing device has a shell, a minimizing basket with multiple filtrating holes, and a minimizing plate with multiple meshes mounted inside the shell. The electrolytic assembly has at least one electrolytic unit. Each electrolytic unit has a tube having an inlet and an outlet, and a cathode and an anode assembled to the tube.

20 Claims, 8 Drawing Sheets

OXYGENATED WATER PRODUCING APPARATUS

BACKGROUND OF THE INVENTION

1. Field of the Invention

The present invention relates to an oxygenated water producing apparatus, and more particularly to an oxygenated water producing apparatus capable of minimizing sizes of oxygen bubbles and electrolyzing the oxygen bubbles contained in water.

2. Description of Related Art

With increasing awareness in healthcare, people pursue high quality drinking water. Oxygenated water, which is abundant in oxygen, is provided on the market. A conventional apparatus for producing oxygenated water has a pump and a pressure tank. Water compressed by the pump is introduced into the pressure tank to go through colliding. Oxygen bubbles break into smaller bubbles as the water is compressed, swirled, and colliding. The oxygen bubbles evenly distributed among the water increase dissolved oxygen (DO) of the water to form the oxygenated water.

However, the conventional apparatus for producing oxygenated water only utilizes the pump to compress and swirl water. The pump has its limit in decreasing size of each one of the oxygen bubbles and is limited in increasing dissolved oxygen in the water.

To overcome the shortcomings of the conventional apparatus for producing oxygenated water, the present invention provides an oxygenated water producing apparatus to mitigate or obviate the aforementioned problems.

SUMMARY OF THE INVENTION

The main objective of the present invention is to provide an oxygenated water producing apparatus that is capable of minimizing sizes of oxygen bubbles and electrolyzing oxygen bubbles contained in water.

The oxygenated water producing apparatus comprises a filtration assembly, an oxygen dissolving assembly, a minimizing assembly, and an electrolytic assembly that communicate with one another. The filtration assembly has a water filtration device, a water softener, and a water purifier communicating with one another in series. The oxygen dissolving assembly has a cooling tank communicating with the water purifier, a pump communicating with the cooling tank, an air pipe connected to the pump, and a pressure tank communicating with the pump. The minimizing assembly has at least one minimizing device. Each minimizing device has a shell, a minimizing basket with multiple filtrating holes, and a minimizing plate with multiple meshes mounted inside the shell. The electrolytic assembly has at least one electrolytic unit. Each electrolytic unit has a tube having an inlet and an outlet, and a cathode and an anode assembled to the tube.

Other objects, advantages, and novel features of the invention will become more apparent from the following detailed description when taken in conjunction with the accompanying drawings.

DETAILED DESCRIPTION OF PREFERRED EMBODIMENTS

The present invention provides an oxygenated water producing apparatus having a filtration assembly 10, an oxygen dissolving assembly 20, a minimizing assembly 30, and an electrolytic assembly 40.

Figure 1:
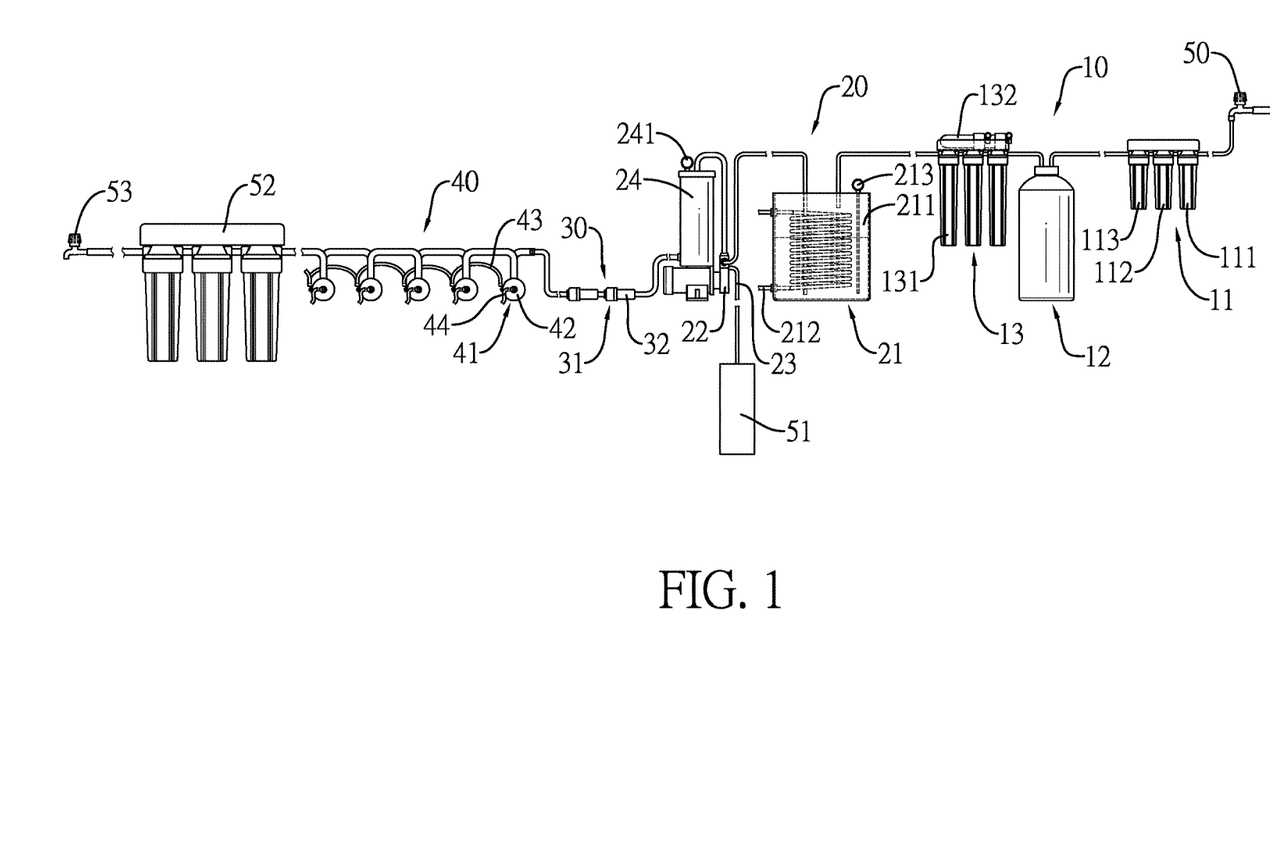
FIG. 1 is a schematic side view of an oxygenated water producing apparatus in accordance with the present invention.
Figure 2:
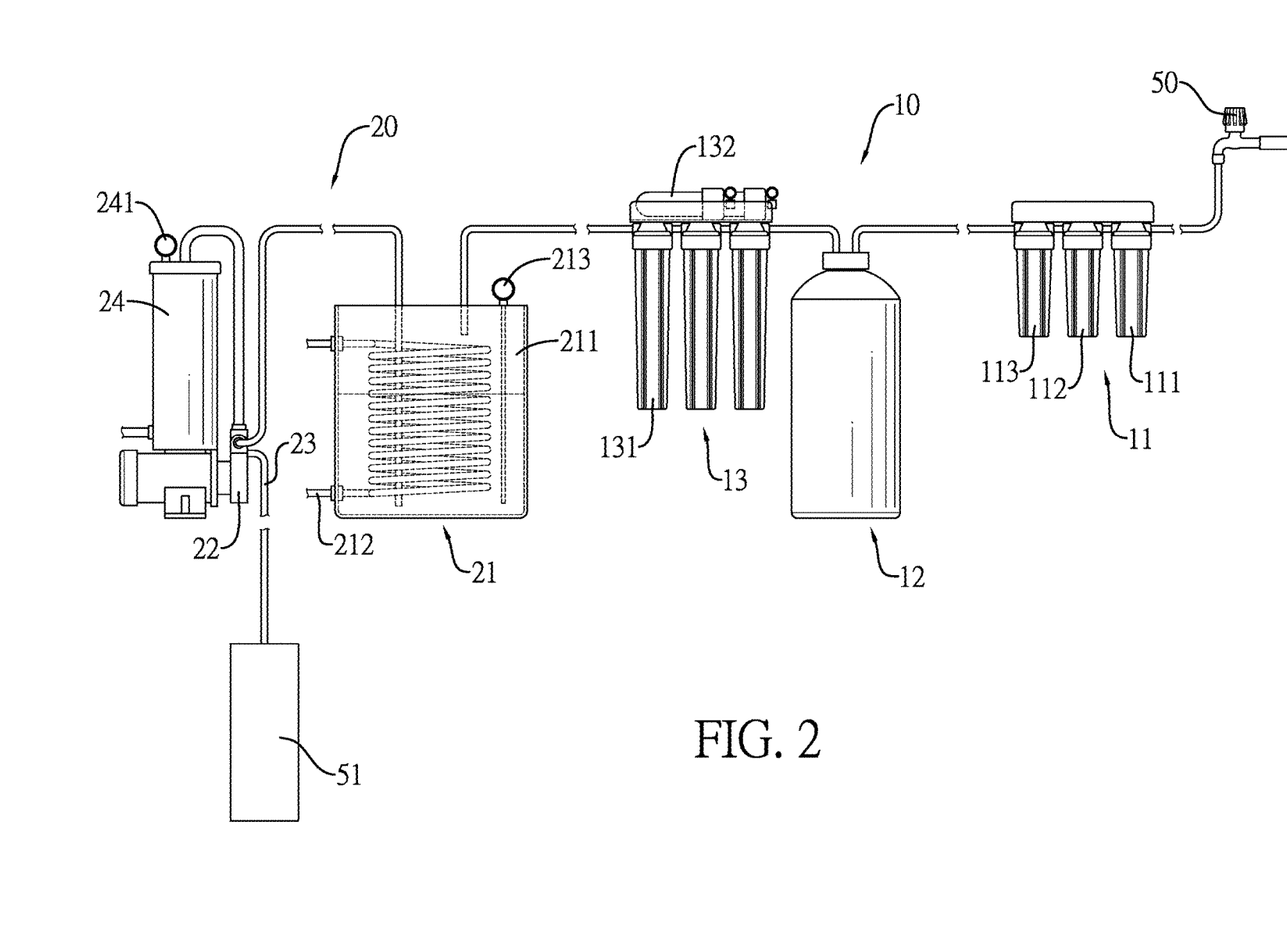
FIG. 2 is an enlarged schematic side view of the oxygenated water producing apparatus in FIG. 1, shown with a filtration assembly and an oxygen dissolving assembly.

With reference to FIGS. 1 and 2, the filtration assembly 10 has a water filtration device 11, a water softener 12, and a water purifier 13. The water filtration device 11, the water softener 12, and the water purifier 13 communicate with one another by piping. The filtration device 11 has a rough filter 111, an absorber 112, and a fine filter 113. The rough filter 111 communicates with the absorber 112. The absorber 112 communicates with the fine filter 113. The water softener 12 communicates with the fine filter 113 by piping. The water purifier 13 has multiple filtrating units 131 and a reverse osmosis device 132. The multiple filtrating units 131 communicate with one another in series. The reverse osmosis device 132 communicates with the multiple filtrating units 131. The water softener 12 is a component made of ion-exchange resin. The absorber 112 of the water filtration device 11 is a component made of active carbon. The filtration assembly 10 communicates with a water supplier 50.

With reference to FIGS. 1 and 2, the oxygen dissolving assembly 20 communicates with the filtration assembly 10. The oxygen dissolving assembly 20 has a cooling tank 21, a pump 22, an air pipe 23, and a pressure tank 24. The cooling tank 21 communicates with the water purifier 13 by piping. The pump 22 communicates with the cooling tank 21 by piping. The air pipe 23 is connected to the pump 22. The pressure tank 24 communicates with the pump 22 by piping. The cooling tank 21 has a body 211, a cooling piping 212, and a thermometer 213. The cooling piping 212 extends into the body 211, spirals inside the body 211, and extends out of the body 211. The thermometer 213 is inserted in the body 211 for measuring temperature inside the body 211. The cooling piping 212 communicates with another water supplier that has a lower water temperature than that of the water supplier 50 communicating with the filtration assembly 10. The pressure tank 24 has a pressure a gauge 241 for measuring an interior pressure of the pressure tank 24.

Figure 4:
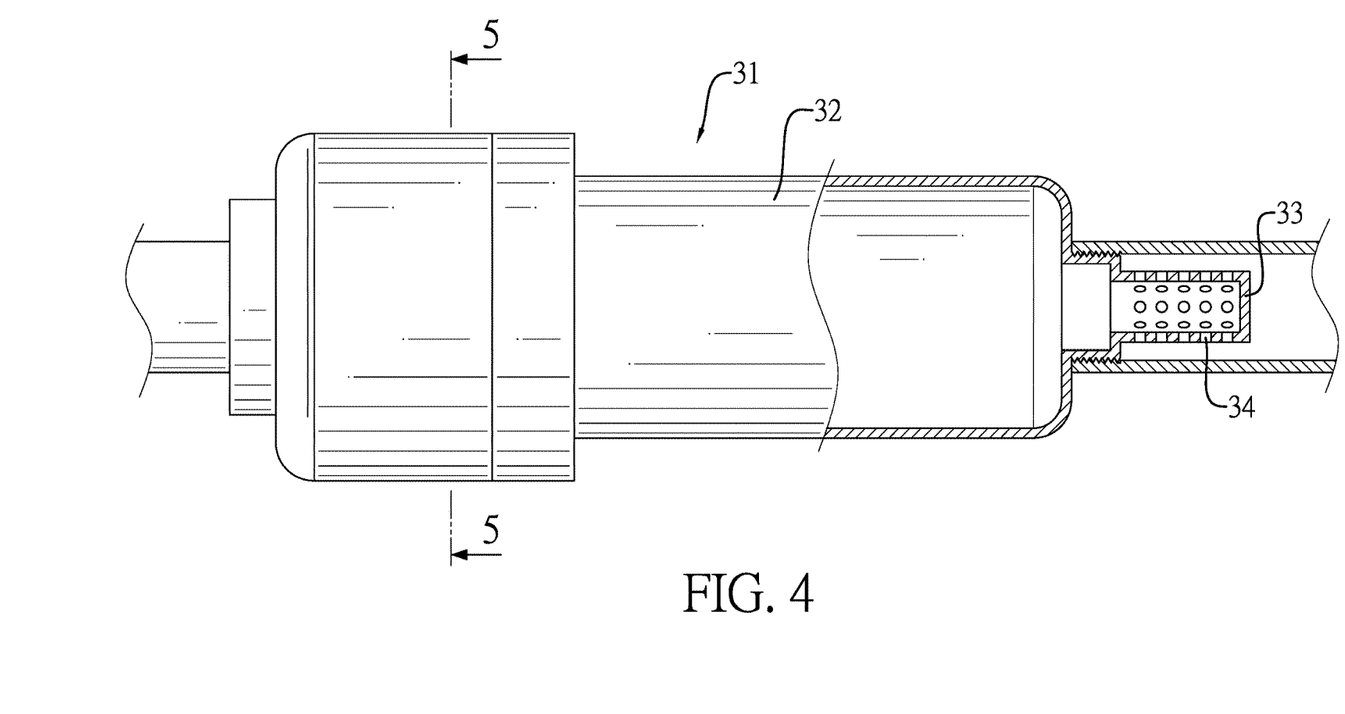
FIG. 4 is a partially cross sectional side view of a minimizing device of the minimizing assembly in FIG. 3.
Figure 5:
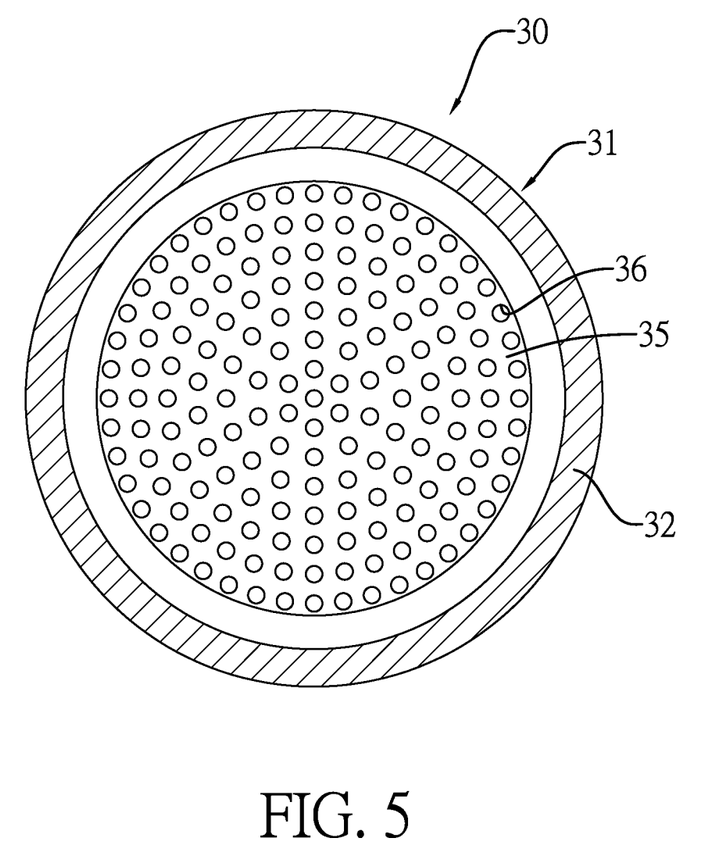
FIG. 5 is a cross sectional side view of the minimizing assembly along line 5-5 in FIG. 4.

With reference to FIGS. 1, 4, and 5, the minimizing assembly 30 communicates with the oxygen dissolving assembly 20 by piping. The minimizing assembly 30 has at least one minimizing device 31. Each one of the at least one minimizing device 31 communicates with the pressure tank 24 by piping and has a shell 32, a minimizing basket 33, and a minimizing plate 35. The minimizing basket 33 is connected to the shell 32 and has multiple filtrating holes 34. The minimizing plate 35 is mounted inside the shell 32 and has multiple meshes 36. The minimizing basket 33 connected to the shell 32 may be disposed at an inlet end of the shell 32. The minimizing plate 35 mounted inside the shell 32 may be disposed at an outlet end of the shell 32. In the embodiment of the present invention, the at least one minimizing device 31 is implemented as two in amount. The two minimizing devices 31 communicate with each other.

Figure 3:
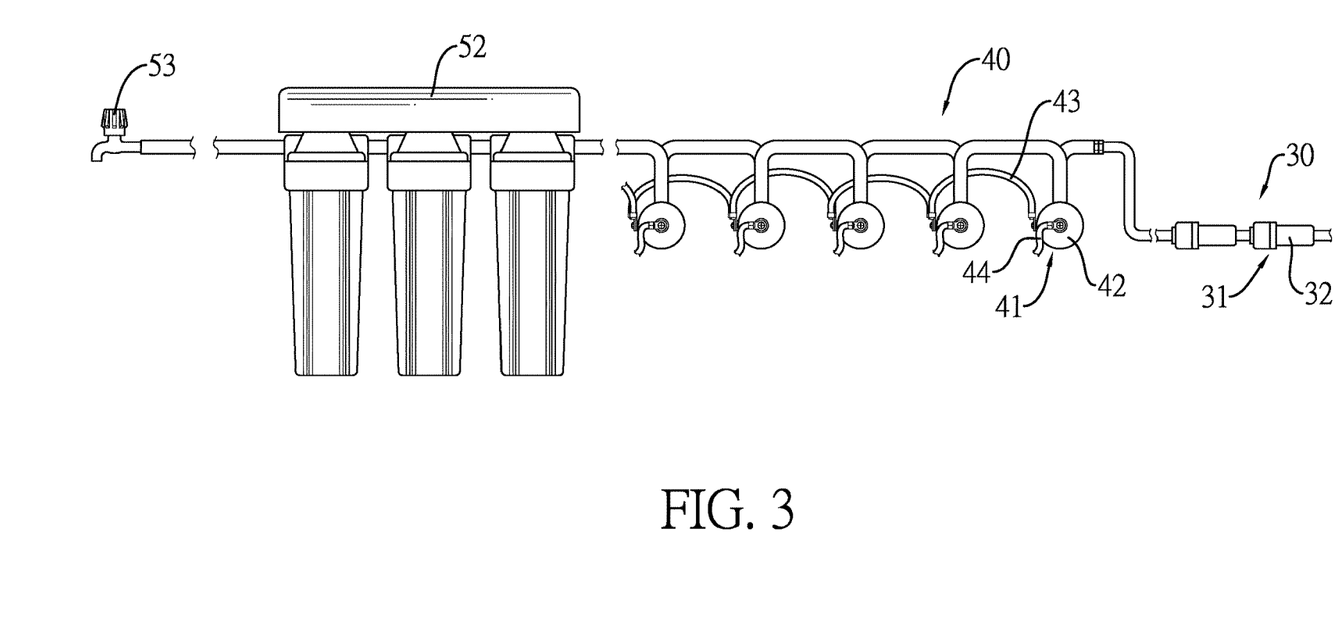
FIG. 3 is another enlarged schematic side view of the oxygenated water producing apparatus in FIG. 1, shown with a minimizing assembly and an electrolytic assembly.
Figure 6:
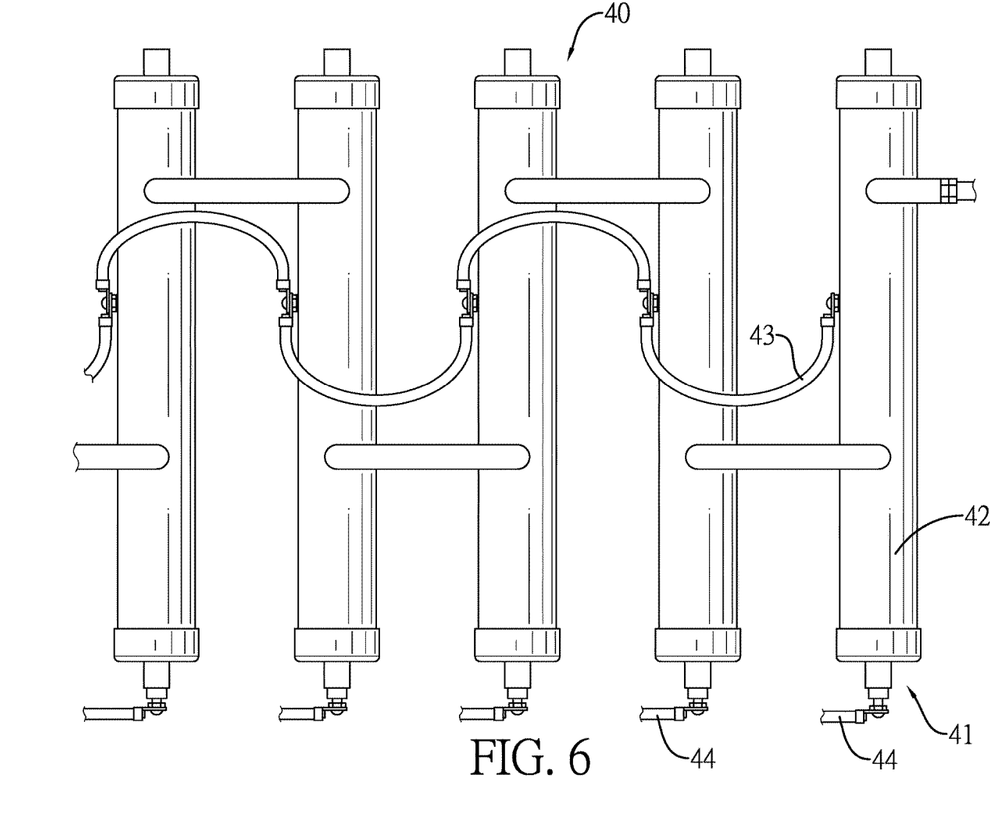
FIG. 6 is a schematic top view of the electrolytic assembly in FIG. 3.
Figure 7:
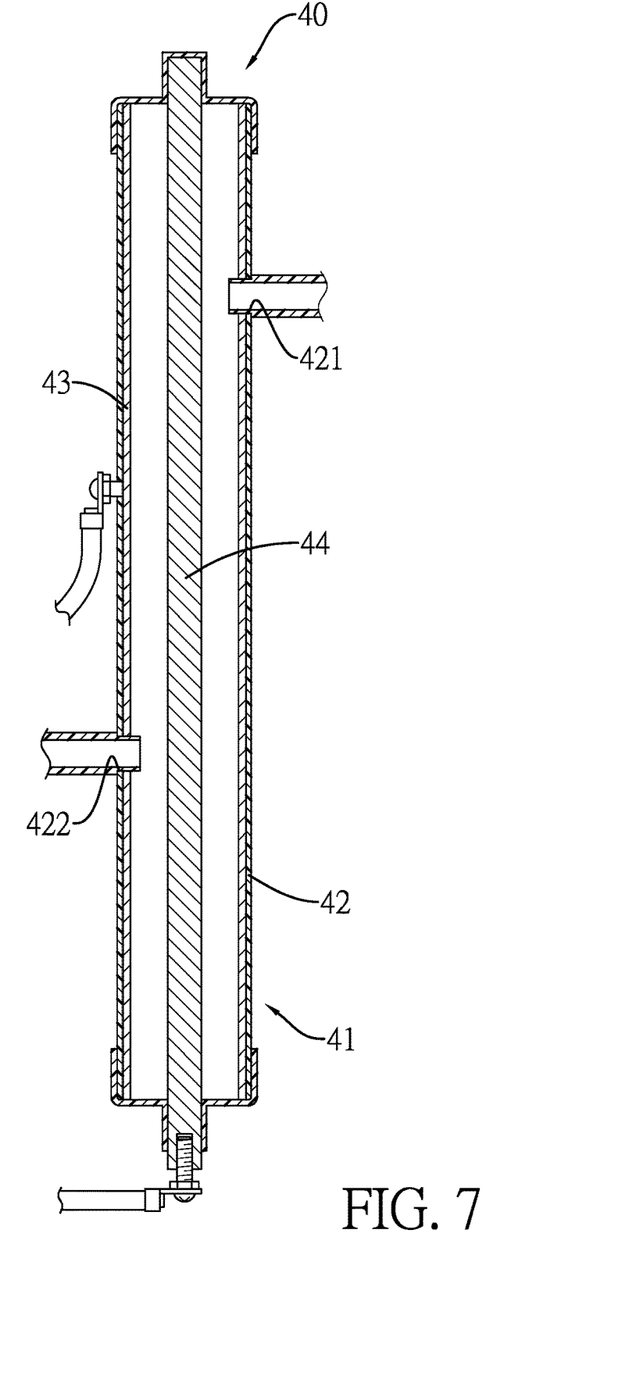
FIG. 7 is a cross sectional side view of an electrolytic unit of the electrolytic assembly in FIG. 3.

With reference to FIGS. 1, 3, and 7, the electrolytic assembly 40 communicates with the minimizing assembly 30 by piping. The electrolytic assembly 40 has at least one electrolytic unit 41. Each one of the at least one electrolytic unit 41 has a tube 42, a cathode 43, and an anode 44. The tube 42 has an inlet 421 and an outlet 422. The cathode 43 and the anode 44 are assembled to and disposed inside the tube 42. With reference to FIG. 7, the cathode 43 is shaped as a sheet and is disposed on an inner surface of the tube 42. The anode 44 is shaped as a bar and is disposed at a middle portion inside the tube 42. The anode 44 is surrounded by the cathode 43. With reference to FIG. 6, in the embodiment of the present invention, the at least one electrolytic unit 41 of the electrolytic assembly 40 is implemented as five in amount. The five electrolytic units 41 communicate with one another in series.

Figure 8:
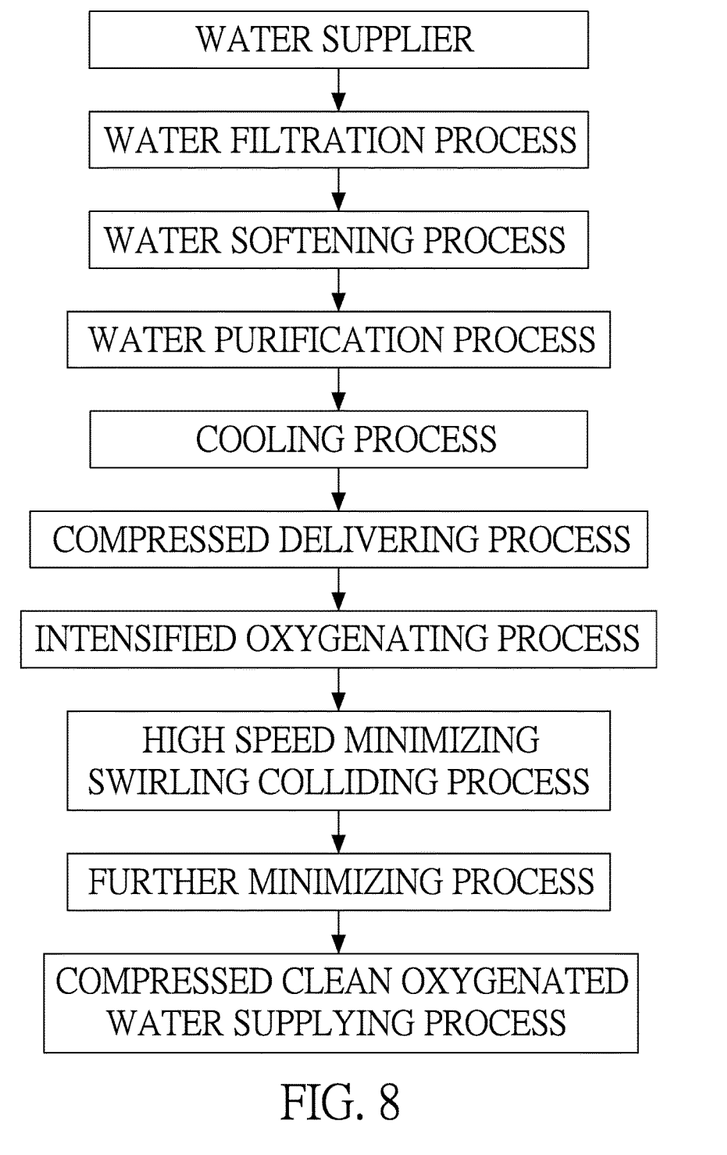
FIG. 8 is a block diagram of a producing procedure of oxygenated water by the oxygenated water producing apparatus in FIG. 1.

With reference to FIGS. 2, 3, and 8, water is introduced from the water supplier 50 to the inside piping of the filtration assembly 10. The water flows into the water filtration device 11 of the water filtration assembly 10 along the piping of the filtration assembly 10. The water passes through the rough filter 111 and is filtrated by a 5-micron filter adopted by the rough filter 111. The water passes through the absorber 112 to remove organic pollutants contained in the water. Then, the water passes through the fine filter 113 and is filtrated by a 1-micron filter of the fine filter 113 for processing more sophisticated filtration than the rough filter 111 to accomplish a water filtration process. The water filtrated by the filtration assembly 11 is introduced in the water softener 12. Calcium ions, magnesium ions, iron ions, and manganese ions in the water are replaced by sodium ions of the ion-exchange resin of the water purifier 13 to reduce water hardness of the water and accomplish a water softening process. The water flows out from the water softener 12 and is introduced into the water purifier 13 to process further filtrating. Then, the water is pushed through the reverse osmosis unit 132 to filter off heavy metal ions, toxin, and bacteria contained in the water for accomplishing a water purification process.

After treatment by the filtration assembly 10, the water is introduced into the cooling tank 21 of the oxygen dissolving assembly 20 to accomplish a cooling process. Temperature of the water descends due to heat exchange with the cooling piping 212 disposed inside the body 211 of the cooling tank 21. The thermometer 213 shows a temperature range of the water from 0 to 10 degrees Celsius (□). The water that has been treated with the cooling process is helpful for a subsequent minimizing process that takes place inside the minimizing assembly 30. The water that has been treated with the cooling process is introduced into the pump 22 at a rotational speed between 1720 and 7200 revolution per minute (rpm). The air pipe 23 is connected to a tank 51 contained with gas such as medical oxygen or ozone. The gas contained in the tank 51 is introduced into the pump 22 through the air pipe 23 to make the water passed through the pump 22 carry oxygen bubbles. The pump 22 compresses the water with oxygen bubbles and pushes the water with oxygen bubbles into the pressure tank 24 to accomplish a compressed delivering process. The pressure gauge 241 of the pressure tank 24 shows the pressure range inside the pressure is between 3 and 12 kilograms per square centimeter. The pump 22 stirs the water and the oxygen bubbles to make the water and the oxygen bubbles collide inside the pressure tank 24 for evenly mixing and accomplish an intensified oxygenating process.

With reference to FIGS. 4, 5 and 6, the water and the oxygen bubbles are mixed and introduced into the minimizing assembly 30. Before entering the shell 32 of the minimizing device 31, the water and the oxygen bubbles first pass through the multiple filtrating holes 34 of the minimizing basket 33. The oxygen bubbles pass through the multiple filtrating holes 34. Each one of the oxygen bubbles is divided into a smaller size, and the oxygen bubbles turn into small oxygen bubbles. The water and the small oxygen bubbles enter the shell 32 and then pass through the multiple meshes 36 of the minimizing plate 35. Each one of the small oxygen bubbles is even divided into a further smaller size by the multiple meshes 36, and the small oxygen bubbles turn into petite oxygen bubbles. In the embodiment of the present invention, the oxygen bubbles divided by two minimizing devices 31 become smaller and smaller and are able to be evenly mixed with the water to accomplish a high speed minimizing swirling colliding process.

With reference to FIGS. 6 to 8, the water and the petite oxygen bubbles are introduced into the electrolytic assembly 40 that adopts direct electric current. Taking one of the five electrolytic units 41 for example, the water and the petite oxygen bubbles pass through the inlet 421 of the tube 42 of the electrolytic unit 41. The cathode 43 of the electrolytic unit 41 provides a negative charge, and the anode 44 provides a positive charge. Voltage range between the cathode 43 and the anode 44 is from 220 to 20000 voltages (V). Each one of the petite bubbles electrolyzed by the electrolytic unit 41 is divided into a much further smaller size. The petite oxygen bubbles turn into fine oxygen bubbles and accomplish a further minimizing process. The smaller the sizes of the oxygen bubbles, the better the distribution of the oxygen bubbles. After the further minimizing process, the electrolyzed water and the fine oxygen bubbles leave the tube 42 from the outlet 422 of the tube 42 and enter a filter 52 to proceed with further filtration. Eventually, the water is discharged from a faucet 53 for people to drink and the water accomplishes a compressed clean oxygenated water supplying process.

The oxygen bubbles turn into the petite oxygen bubbles by dividing by the multiple filtrating holes 34 and the multiple meshes 36 as passing through the two minimizing devices 31. And then the petite oxygen bubbles are divided into fine oxygen bubbles by electrolyzing by the electrolytic assembly 40. The oxygen bubbles turn into the fine oxygen bubbles that are able to be mixed with the water to promote dissolved oxygen of the water.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An oxygenated water producing apparatus comprising:
a filtration assembly having a water filtration device, a water softener, and a water purifier communicating with one another in series;
an oxygen dissolving assembly communicating with the filtration assembly and having
a cooling tank communicating with the water purifier;
a pump communicating with the cooling tank;
an air pipe connected to the pump; and
a pressure tank communicating with the pump;
a minimizing assembly communicating with the oxygen dissolving assembly and having
at least one minimizing device communicating with the pressure tank, and each one of the at least one minimizing device having
a shell;
a minimizing basket connected to the shell and having multiple filtrating holes; and
a minimizing plate mounted inside the shell and having multiple meshes;
an electrolytic assembly communicating with the minimizing assembly and having at least one electrolytic unit;
each one of the at least one electrolytic unit having
a tube having an inlet and an outlet;
a cathode assembled to the tube; and
an anode assembled to the tube.

2. The oxygenated water producing apparatus as claimed in claim 1, wherein
the water filtration device has
a rough filter;
an absorber communicating with the rough filter; and
a fine filter communicating with the absorber;
the water softener communicates with the fine filter and has multiple filtrating units communicating with one another in series; and
a reverse osmosis unit communicating with the multiple filtrating units.

3. The oxygenated water producing apparatus as claimed in claim 2, wherein the cooling tank has
a body;
a cooling piping extending into the body, spiraling inside the body, and extending out of the body; and
a thermometer inserted in the body for measuring temperature inside the body.

4. The oxygenated water producing apparatus as claimed in claim 1, wherein the cooling tank has
a body;
a cooling piping extending into the body, spiraling inside the body, and extending out of the body; and
a thermometer inserted in the body for measuring temperature inside the body.

5. The oxygenated water producing apparatus as claimed in claim 1, wherein
the tube of each one of the at least one electrolytic unit is insulated;
the cathode of each one of the at least one electrolytic unit is shaped as a sheet and is disposed on an inner surface of the tube of each one of the at least one electrolytic unit; and
the anode of each one of the at least one electrolytic unit is shaped as a bar and is disposed at a middle portion of the tube.

6. The oxygenated water producing apparatus as claimed in claim 2, wherein
the tube of each one of the at least one electrolytic unit is insulated;
the cathode of each one of the at least one electrolytic unit is shaped as a sheet and is disposed on an inner surface of the tube of each one of the at least one electrolytic unit; and
the anode of each one of the at least one electrolytic unit is shaped as a bar and is disposed at a middle portion of the tube.

7. The oxygenated water producing apparatus as claimed in claim 3, wherein
the tube of each one of the at least one electrolytic unit is insulated;
the cathode of each one of the at least one electrolytic unit is shaped as a sheet and is disposed on an inner surface of the tube of each one of the at least one electrolytic unit; and
the anode of each one of the at least one electrolytic unit is shaped as a bar and is disposed at a middle portion of the tube.

8. The oxygenated water producing apparatus as claimed in claim 4, wherein
the tube of each one of the at least one electrolytic unit is insulated;
the cathode of each one of the at least one electrolytic unit is shaped as a sheet and is disposed on an inner surface of the tube of each one of the at least one electrolytic unit; and
the anode of each one of the at least one electrolytic unit is shaped as a bar and is disposed at a middle portion of the tube.

9. The oxygenated water producing apparatus as claimed in claim 1, wherein
the water softener is a component made of ion-exchange resin; and
the absorber is a component made of active carbon.

10. The oxygenated water producing apparatus as claimed in claim 2, wherein
the water softener is a component made of ion-exchange resin; and
the absorber is a component made of active carbon.

11. The oxygenated water producing apparatus as claimed in claim 3, wherein
the water softener is a component made of ion-exchange resin; and
the absorber is a component made of active carbon.

12. The oxygenated water producing apparatus as claimed in claim 4, wherein
the water softener is a component made of ion-exchange resin; and
the absorber is a component made of active carbon.

13. The oxygenated water producing apparatus as claimed in claim 7, wherein
the water softener is a component made of ion-exchange resin; and
the absorber is a component made of active carbon.

14. The oxygenated water producing apparatus as claimed in claim 1, wherein the pressure tank has a pressure gauge for measuring an interior pressure of the pressure tank.

15. The oxygenated water producing apparatus as claimed in claim 3, wherein the pressure tank has a pressure gauge for measuring an interior pressure of the pressure tank.

16. The oxygenated water producing apparatus as claimed in claim 5, wherein the pressure tank has a pressure gauge for measuring an interior pressure of the pressure tank.

17. The oxygenated water producing apparatus as claimed in claim 7, wherein the pressure tank has a pressure gauge for measuring an interior pressure of the pressure tank.

18. The oxygenated water producing apparatus as claimed in claim 9, wherein the pressure tank has a pressure gauge for measuring an interior pressure of the pressure tank.

19. The oxygenated water producing apparatus as claimed in claim 11, wherein the pressure tank has a pressure gauge for measuring an interior pressure of the pressure tank.

20. The oxygenated water producing apparatus as claimed in claim 13, wherein the pressure tank has a pressure gauge for measuring an interior pressure of the pressure tank.

\* \* \* \* \*